United States Patent
Ahn et al.

[11] Patent Number: 6,061,106
[45] Date of Patent: May 9, 2000

[54] LIQUID CRYSTAL DISPLAY DEVICE HAVING A LIQUID CRYSTAL LAYER WITH A VARYING THICKNESS

[75] Inventors: Young Soo Ahn; Yong Beom Kim, both of Kyungki-do; Young Seok Choi, Daejeon, all of Rep. of Korea

[73] Assignee: LG Electronics Inc., Seoul, Rep. of Korea

[21] Appl. No.: 09/064,064

[22] Filed: Apr. 22, 1998

[30] Foreign Application Priority Data

Apr. 23, 1997 [KR] Rep. of Korea ............... 97-15062

[51] Int. Cl.⁷ ................ G02F 1/1347; G02F 1/1335
[52] U.S. Cl. ............... 349/83; 349/76; 349/106; 349/107
[58] Field of Search ............... 349/106, 107, 349/83, 76

[56] References Cited

U.S. PATENT DOCUMENTS

| | | | |
|---|---|---|---|
| 4,948,231 | 8/1990 | Aoki et al. | 350/334 |
| 5,042,920 | 8/1991 | Yoshino et al. | 359/68 |
| 5,150,235 | 9/1992 | Haim et al. | 349/107 |
| 5,237,437 | 8/1993 | Rupp | 349/107 |
| 5,358,810 | 10/1994 | Yoshino | 430/20 |
| 5,644,415 | 7/1997 | Aoki et al. | 349/122 |
| 5,724,112 | 3/1998 | Yoshida et al. | 349/121 |
| 5,734,455 | 3/1998 | Yoshida et al. | 349/99 |
| 5,753,937 | 5/1998 | Shimomaki et al. | 349/80 |
| 5,790,219 | 8/1998 | Yamaguchi et al. | 349/106 |
| 5,850,271 | 12/1998 | Kim et al. | 349/111 |
| 5,861,928 | 1/1999 | Sekiguchi | 349/49 |

FOREIGN PATENT DOCUMENTS

| | | |
|---|---|---|
| 3-245122 | 10/1991 | Japan . |
| 5-323337 | 12/1993 | Japan . |
| 7-270822 | 10/1995 | Japan . |

*Primary Examiner*—William L. Sikes
*Assistant Examiner*—Tarifur R. Chowdhury
*Attorney, Agent, or Firm*—Morgan, Lewis & Bockius LLP

[57] ABSTRACT

A liquid crystal display device with an enhanced viewing angle characteristics includes a liquid crystal layer between first and second substrates, and a first portion having a first thickness and a second portion having a second thickness smaller than the first thickness. The first portion of the liquid crystal layer satisfies a condition $\Delta n \cdot d \geq \lambda/2$, where $\Delta n$ is optical anisotropy of the liquid crystal, d is a thickness of the liquid crystal layer, and $\lambda$ is a wavelength of transmitted light in the liquid crystal layer.

18 Claims, 5 Drawing Sheets

FIG·1
PRIOR ART

FIG · 2
PRIOR ART

LIQUID CRYSTAL DISPLAY DEVICE HAVING A LIQUID CRYSTAL LAYER WITH A VARYING THICKNESS

This application claims the benefit of Korean Patent Application No. 1997-15062, filed in Korea on Apr. 23, 1997, which is hereby incorporated by reference.

BACKGROUND OF THE INVENTION

1. Field of the Invention

The present invention relates to a liquid crystal display device, and more particularly, to a wide viewing angle liquid crystal display device (LCD).

2. Discussion of the Related Art

A twisted nematic liquid crystal display device (TN LCD) is a type of an LCD that is currently in wide use. TN LCDs, however, have a major drawback in that light transmittance in each grey level seen by a user depends on the viewing angle of the user. This contrast angular dependence is especially strong in the up and down direction. The angular dependence in the up and down direction is caused by the electrically induced liquid crystal director configuration.

FIG. 1 is a plan view of a unit pixel of a conventional active matrix LCD. A unit pixel is defined by data bus lines 11 and 11', and gate bus lines 15 and 15'. The data bus lines 11 and 11', and the gate bus lines 15 and 15' are respectfully arranged perpendicular to each other to form a matrix. A thin film transistor (TFT) is formed at a cross point of the data bus line 11 and the gate bus line 15 in the unit pixel. A gate electrode 13 is connected to the gate bus line 15. A source/drain electrode 12 is connected to the data bus line 11. A pixel electrode 16 is formed in the unit pixel and electrically connected to the source/drain electrode 12.

Gate and data driving circuits (not illustrated) are outside the liquid crystal panel and respectively connected to the gate bus line 15 and the data bus line 11. When the gate driving circuit applies a voltage to the gate electrode 13 through the gate bus line 15, the TFT is turned on. At the same time, an image signal applied to the data bus line 11 from the data driving circuit through the source/drain electrode 12 is applied to the pixel electrode 16.

FIG. 2 is a cross-sectional view of the unit pixel shown in FIG. 1 along the I—I' line. An insulator 3 is formed on a first substrate 1 to insulate the gate and data bus lines. On the insulator 3, the data bus line 11, a passivation layer 7, and the pixel electrode 9 are formed in sequence. A first alignment layer 17 is formed on the pixel electrode 9. On a second substrate 2, a black matrix 4 is formed to prevent a light leakage. Then, a color filter layer 5, an overcoat layer 8, and a counter electrode 19 are formed in sequence. A second alignment layer 18 corresponding to the first alignment layer 17 is formed on the counter electrode 19. An alignment direction of liquid crystal (not illustrated) in a liquid crystal layer 6 is determined by the first and second alignment layers.

The conventional LCD having the above-discussed structure aims to provide uniform alignment of liquid crystal in the unit pixel electrode by applying a uniform electric field caused by a flat pixel and the counter electrode. However, with the uniform arrangement of liquid crystal of the conventional LCD, a phase difference of light passing through the unit pixel is created according to a change in the viewing direction of the user. As a result, the viewing angle characteristics of the LCD are limited.

When the alignment layer is formed by a rubbing method, a uniform arrangement of the liquid crystal limits the viewing-angle of the LCD. Currently, researches are being actively carried out for multidomain LCDs with a light transmittance compensation in the up and down direction for improved the viewing angle characteristics. A two-domain LCD is an example of these multidomain LCDs. A method of manufacturing a two-domain LCD comprises the steps of depositing a first photoresist on a first domain of the substrate, establishing a first alignment direction by rubbing a substrate in a first fixed direction, removing the first photoresist on the first domain of the substrate, depositing a second photoresist on a second domain of the substrate and establishing a second alignment direction by rubbing the substrate in a second fixed direction different from the first fixed direction. It is also possible to manufacture a multi-domain LCD with more than two domains by repeating the above process.

However, since portions of the LCD connected to the liquid crystal layer may be damaged by repeated rubbing steps during the manufacture of the multidomain LCD, the yield is decreased. Moreover, a number of manufacturing steps are necessary to create multiple domains, thereby increasing the cost of manufacturing the multidomain LCDs.

SUMMARY OF THE INVENTION

Accordingly, the present invention is directed to a liquid crystal display device that substantially obviates one or more of the problems due to limitations and disadvantages of the related art.

Another object of the present invention is to provide an LCD which has viewing angle characteristics enhanced by multiple liquid crystal cell gaps and electric field distortion.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a liquid crystal layer between first and second substrates. The liquid crystal layer has a first portion having a first thickness, and a second portion having a second thickness smaller than the first thickness. The first portion satisfies a condition $\Delta n \cdot d \geq \lambda/2$, where $\Delta n$ is optical anisotropy of the liquid crystal, d is a thickness of the liquid crystal layer, and $\lambda$ is a wavelength of transmitted light in the liquid crystal layer.

In another aspect of the present invention, a liquid crystal display device includes first and second substrates; data bus lines and gate bus lines over the first substrate for defining a unit pixel, the data and gate bus lines being arranged in a matrix; a thin film transistor formed over the first substrate at a cross point of the data and gate bus lines in the unit pixel; a passivation layer formed over the first substrate in the unit pixel, the passivation layer having a surface with at least one step; a pixel electrode formed over the passivation layer and the first substrate, whereby the pixel layer having at least one step corresponding to the at least one step of the passivation layer; a first alignment layer formed on the pixel electrode; a black matrix over the second substrate; a color filter layer formed on the black matrix and over the second substrate; an overcoat layer formed on the color filter layer, the overcoat layer having a surface with at least one step corresponding to the at least one step of the passivation layer; a counter electrode formed on the surface of the overcoat layer, the counter electrode having at least one step corresponding to the steps of the overcoat layer and the pixel electrode; a second alignment layer formed on the counter electrode; and a liquid crystal layer between the first and second alignment layers. The liquid crystal layer has a shape corresponding to the steps of the pixel and counter electrodes, and includes a first portion having a first thickness and a second portion having a second thickness smaller than the first thickness, wherein $\Delta n \cdot 1 \geq \lambda/2$, where $\Delta n$ is optical anisotropy of the liquid crystal, d1 is the first thickness of the liquid crystal layer, and $\lambda$ is a wavelength of transmitted light in the liquid crystal layer.

In another aspect of the present invention, a liquid crystal display device includes first and second substrates; a color filter over the second substrate; a first layer over the color filter, the first layer having a surface with a pattern; and a liquid crystal layer between the first substrate and the first layer, wherein a thickness of the liquid crystal layer varies according to the pattern.

In a further aspect of the present invention, a liquid crystal display device includes first and second substrates; a first layer over the first substrate, the first layer having a surface with a first pattern; a second layer over the second substrate, the second layer having a surface with a second pattern; and a liquid crystal layer between the respective surfaces of the first and second layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
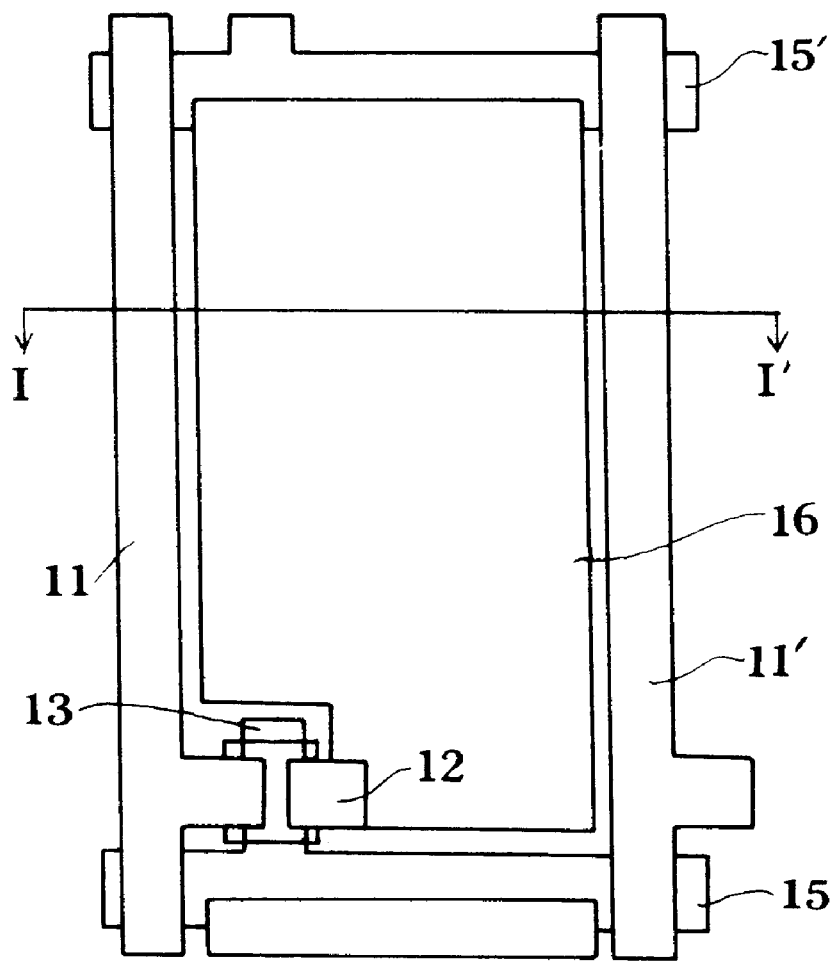
FIG. 1 is a plan view of a unit pixel of a conventional active matrix LCD.
Figure 2:
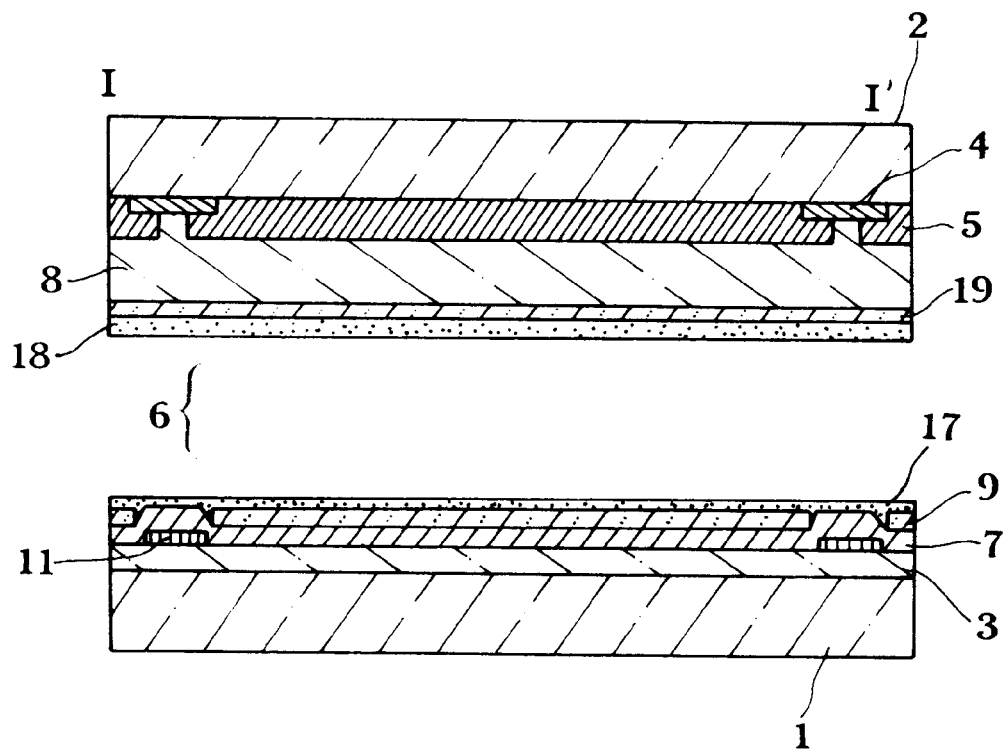
FIG. 2 is a cross sectional view taken along line I—I' of FIG. 1.
Figure 3:
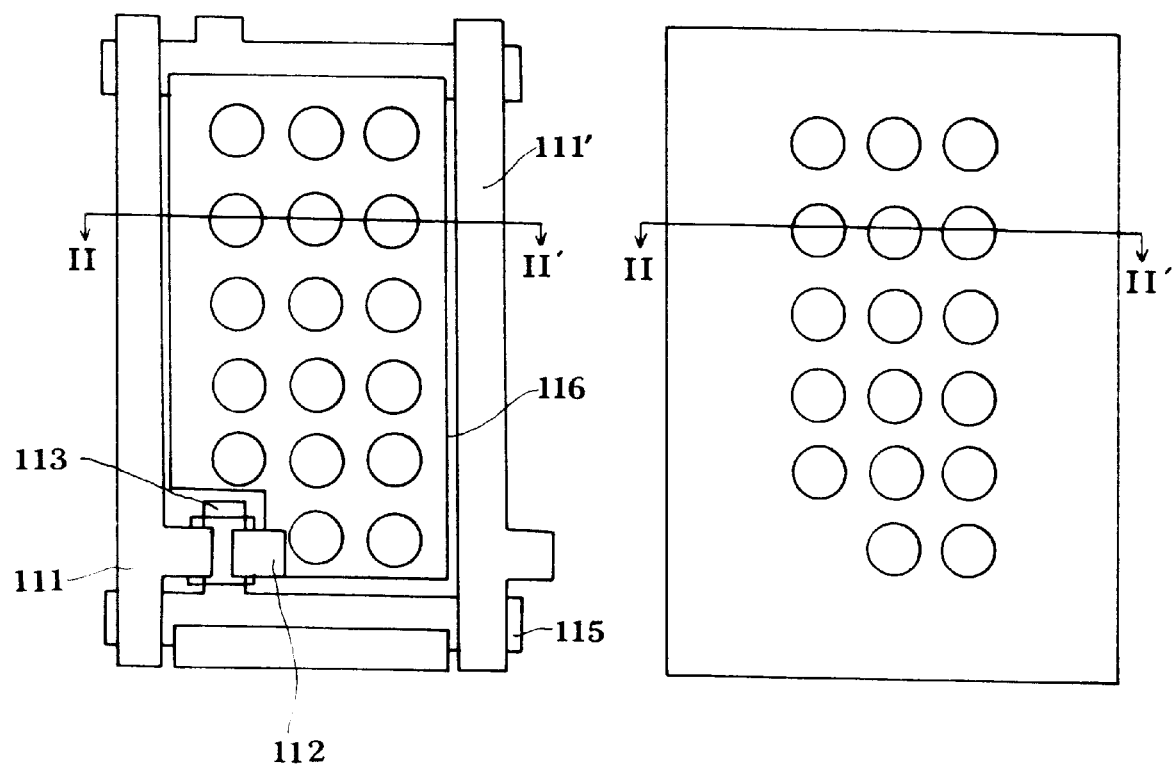
FIG. 3 is a plan view of a unit pixel of an LCD according to the present invention.

FIG. 3 is a plan view of a unit pixel of an LCD according to the present invention. A plurality of data bus lines 111 and 111', and gate bus lines 115 are arranged perpendicular to each other in a matrix to define pixel regions. A TFT is formed at a cross point of the data and gate bus lines. A pixel electrode 116 is electrically connected to the TFT.

Figure 4:
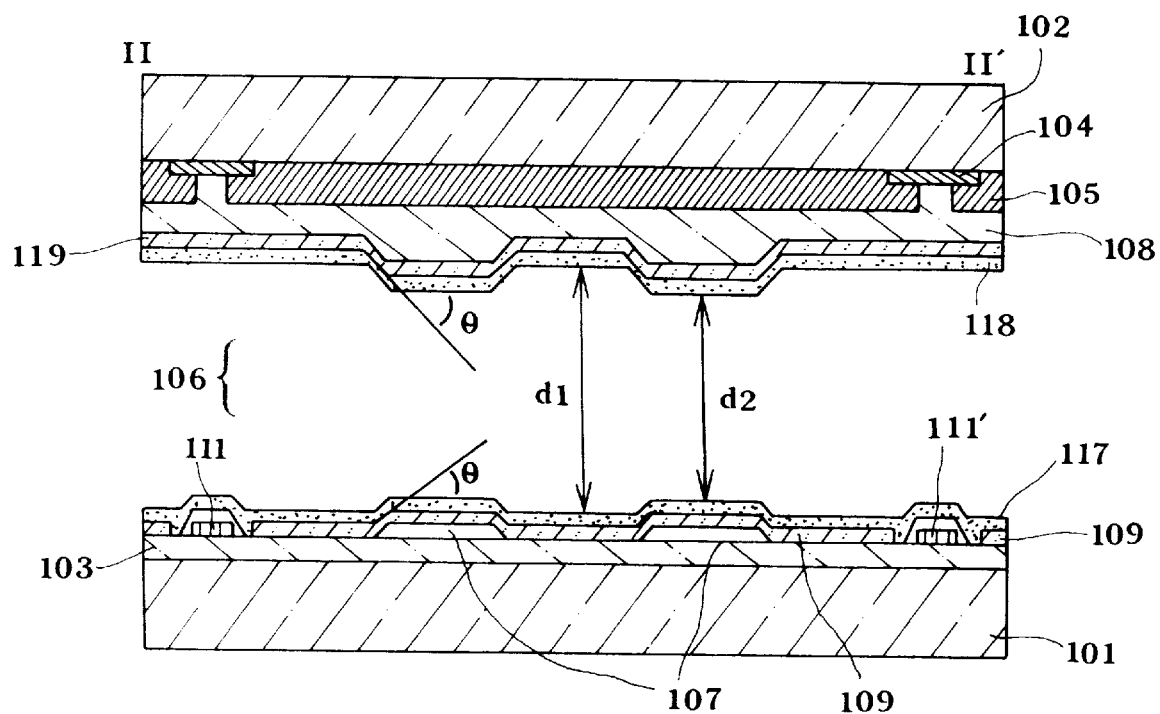
FIG. 4 is a cross sectional view taken along line II—II' of FIG. 3.

FIG. 4 is a cross sectional view taken along line II—II' of FIG. 3. An insulator 103 including dielectric material such as SiNx or SiOx is formed on a first substrate 101 by CVD (chemical vapor deposition) method. The data bus lines 111 and 111', and a passivation layer 107 are sequentially formed on the insulator 103. A pixel electrode 109 is formed in a pixel region over a passivation layer 107 and the insulator 103. A first alignment layer 117 is formed on the pixel electrode 109. As shown in FIG. 4, the surface of the first alignment layer 117 has a pattern.

On a second substrate 102, a black matrix 104 is formed to prevent a light leakage by photolithography and etching Cr or CrOx. A color filter layer 105 is formed on the second substrate 102 and the black matrix 104 as shown in FIG. 4. An overcoat layer 108 having a patterned surface is formed on the color filter layer 105 and the black matrix 104. A counter electrode 119 including a transparent metal such as ITO (indium tin oxide) is formed on the color filter 105. A second alignment layer 118 with a surface pattern corresponding to that of the first alignment layer 117 is formed on the counter electrode 119. An alignment direction of liquid crystal (not illustrated) in a liquid crystal layer 106 is determined by the first and second alignment layers 117 and 118.

In a method of fabricating the LCD having the above structure of the present invention, the overcoat layer 108 is first patterned to have at least two different thicknesses, e.g., steps, at fixed intervals with a use of a mask. Also, a fixed angle of inclination θ at the sides of each step is preferably formed by controlling the exposing and developing durations of the overcoat layer 108. Further, corresponding steps are formed on the surface of the passivation layer 107 with a pattern similar to the patterned overcoat layer 108. As with the overcoat layer 108, the fixed angle of inclination θ at sides of the steps is preferably formed by controlling the exposing and developing durations of the passivation layer 107. The fixed angle of inclinations of the passivation layer 107 and the overcoat layer 108 is preferaby the same. However, the inclinations may be different.

Since the overcoat layer 108 and the passivation layer 107 are formed to have tapered steps, the counter electrode 119 and the pixel electrode 109, which are respectively formed on the overcoat layer 108 and the passivation layer 107, have similarly tapered steps. These steps at the respective surfaces of the counter electrode 119 and the pixel electrode 109 create two different cell gaps d1 and d2. The larger cell gap d1 is created to satisfy a first minimum condition, $$\Delta n \cdot d \geq \lambda/2, \qquad \text{(Equation 1)}$$

where $\Delta n$ is optical anisotropy, d is a cell gap of the liquid crystal, and $\lambda$ is a wavelength of light. The smaller cell gap d2 is set based on material characteristics of the liquid crystal and manufacturing process parameters.

At the cell gap d1, light transmittance is at a maximum in the direction perpendicular to the surface of the liquid crystal layer. However, an increasing polar angle creates a phase difference which in turn causes a change in light retardation relative to the light retardation in the perpendicular direction. Accordingly, viewing angle characteristics deteriorate with the increasing polar angle. However, the neighboring smaller cell gap d2 reduces the change in light retardation thereby enhancing the overall viewing angle characteristics.

Figure 5:
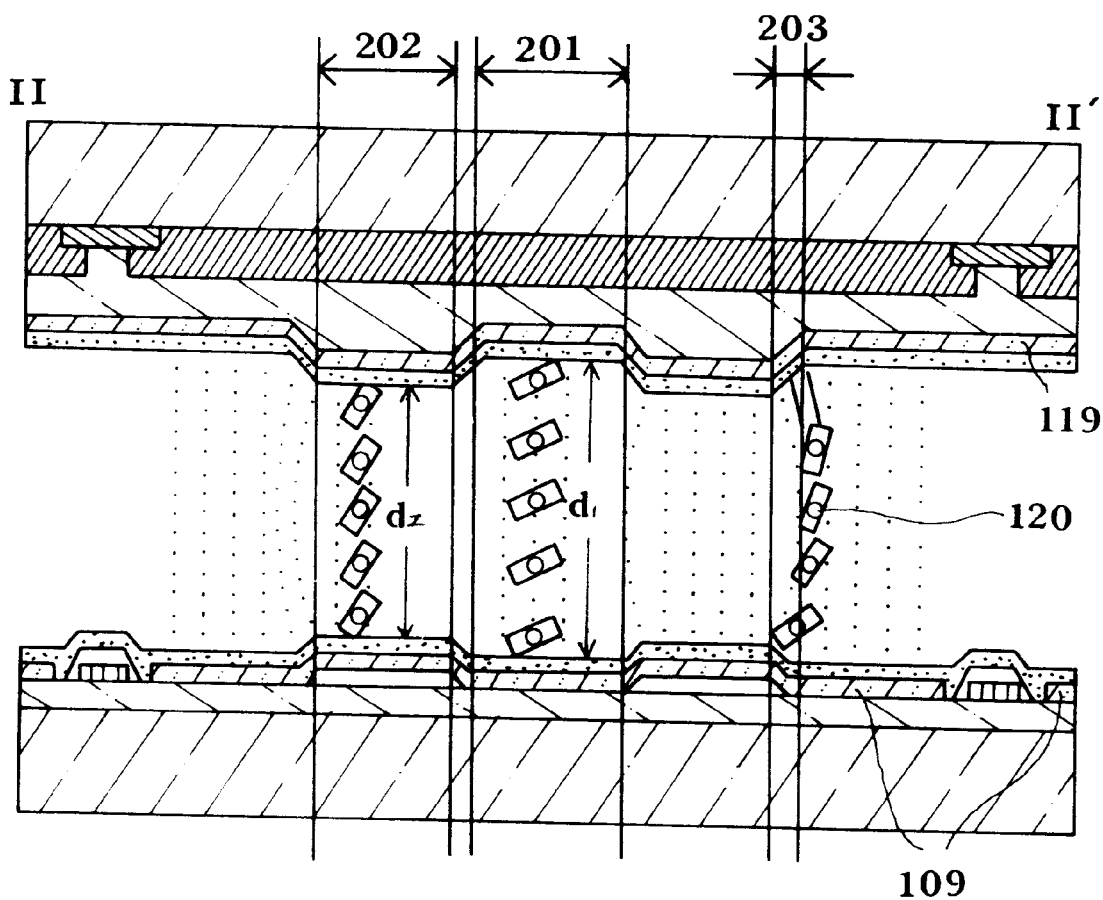
FIG. 5 is a cross sectional view showing a liquid crystal arrangement of the LCD according to the present invention.

FIG. 5 is a cross sectional view showing a liquid crystal arrangement of the LCD according to the present invention. When a voltage is applied between the pixel electrode 109 and the counter electrode 119, the arrangement of liquid crystal is determined by the direction and intensity of the electric field at each of regions 201, 202, and 203.

In the LCD according to the present invention, at least three different electric fields are created—Ed1, Ed2 respectively by cell gaps d1 and d2, and $E_{distortion}$ by the slope at the sides of the steps. The electric fields Ed1 and Ed2 are defined by the following equations:

$$Ed1 = Vin/d1, \quad \text{(Equation 2)}$$

$$Ed2 = Vin/d2, \quad \text{(Equation 3)}$$

where Vin is the voltage between the pixel electrode and the counter electrode.

As can be seen from the Equations 2 and 3, electric fields Ed1 and Ed2 created by the cell gaps d1 and d2 are different in spite of the uniform voltage Vin. Accordingly, arrangement of liquid crystal 120 at the cell gap d1 is different from the arrangement at the cell gap d2 as shown in FIG. 5. Further, since an electric field is formed perpendicular to the surface of the conductor, a distortion of electric field is created by the inclined regions 203 on the pixel and counter electrodes. The arrangement of liquid crystal 120 changes according to the distorted electric field by dielectric anisotropy of the liquid crystal 120. Accordingly, it is possible to increase the contrast ratio by appropriately compensating for the retardation by a phase difference of light in liquid crystal cells at a black status having a maximum voltage in a normally white mode.

The LCD according to the present invention compensates the retardation caused by the phase difference of light in liquid crystal cells with inclined steps at fixed intervals on the surfaces of the counter and pixel electrodes. Furthermore, the LCD according to the present invention provides enhanced viewing angle characteristics with the inclined steps that create both the electric fields that are perpendicular to the electrodes and the distorted electric fields at the slopes with a fixed angle when a voltage is applied between the pixel and counter electrodes.

Accordingly, the LCD of the present invention has viewing angle characteristics enhanced by multiple liquid crystal cell gaps and electric field distortion that are preferably created with steps tapered at a fixed angle in a unit pixel.

It will be apparent to those skilled in the art that various modification and variations can be made in the liquid crystal display device of the present invention without departing from the spirit or scope of the inventions. Thus, it is intended that the present invention cover the modifications and variations of this invention provided they come within the scope of the appended claims and their equivalents.

What is claimed is:

1. A liquid crystal display device comprising:

first and second substrates;

data bus lines and gate bus lines over said first substrate for defining a unit pixel, said data and gate bus lines being arranged in a matrix;

a thin film transistor over said first substrate adjacent a cross point of said data and gate bus lines in said unit pixel;

a passivation layer over said first substrate in said unit pixel, said passivation layer having a surface with at least one step;

a pixel electrode over said passivation layer and said first substrate, said pixel electrode having at least one step corresponding to said at least one step of said passivation layer;

a first alignment layer on said pixel electrode;

a black matrix over said second substrate;

a color filter layer on said black matrix and over said second substrate;

an overcoat layer on said color filter layer, said overcoat layer having a surface with at least one step corresponding to said at least one step of said passivation layer;

a counter electrode on said surface of said overcoat layer, said counter electrode having at least one step corresponding to said steps of said overcoat layer and said pixel electrode;

a second alignment layer on said counter electrode; and a liquid crystal layer between said first and second alignment layers, said liquid crystal layer having a shape corresponding to said steps of said pixel and counter electrodes and including:

a first portion having a first thickness; and a second portion having a second thickness smaller than said first thickness, wherein $\Delta n \cdot d1 \geq \lambda/2$, where $\Delta n$ is optical anisotropy of said liquid crystal, d1 is said first thickness of said liquid crystal layer, and $\lambda$ is a wavelength of transmitted light in said liquid crystal layer.

2. The liquid crystal display device according to claim 1, wherein at least one of said pixel and counter electrodes is a transparent electrode.

3. The liquid crystal display device according to claim 1, wherein at least one of said steps of said passivation layer, pixel electrode, overcoat layer, and counter electrode is tapered at an angle.

4. The liquid crystal display device according to claim 1, wherein said one step of said pixel electrode is substantially directly facing said one step of said overcoat layer.

5. A liquid crystal display device comprising:

first and second substrates;

a color filter over said second substrate;

an overcoat layer over said color filter, said overcoat layer having a surface shape including at least one step, wherein said surface shape of said overcoat layer including said at least one step does not correspond to a surface shape of said color filter;

a first layer over said overcoat layer, said first layer having a surface with a pattern corresponding to said surface shape of said overcoat layer; and a liquid crystal layer between said first substrate and said first layer, wherein a thickness of said liquid crystal layer varies according to said pattern.

6. The liquid crystal display device of claim 5, wherein said pattern includes steps at defined intervals.

7. The liquid crystal display device according to claim 5, further comprising:

an alignment layer between said first layer and said liquid crystal layer, wherein said first layer is a counter electrode.

8. The liquid crystal display device according to claim 7, further comprising:

data bus lines and gate bus lines over said first substrate defining a unit pixel, said data and gate bus lines being arranged in a matrix;

a thin film transistor over said first substrate adjacent a cross point of said data and gate bus lines in said unit pixel;

a passivation layer over said first substrate in said unit pixel, a pixel electrode over said passivation layer and said first substrate; and a second alignment layer on said pixel electrode, wherein said liquid crystal layer is between said alignment layers.

9. The liquid crystal display device according to claim 7, wherein said at least one step of said overcoat layer is tapered at an angle, wherein said pattern of said counter electrode includes at least the step tapered substantially at said predetermined angle, and wherein said liquid crystal layer includes:
- a first portion having a first thickness; and
- a second portion having a second thickness smaller than said first thickness,
  wherein said first and second portions correspond to said at least one tapered step of said counter electrode.

10. The liquid crystal display device according to claim 9, wherein $\Delta n \cdot d1 \geq \lambda/2$, where $\Delta n$ is optical anisotropy of said liquid crystal, d1 is said first thickness of said liquid crystal layer, and $\lambda$ is a wavelength of transmitted light in said liquid crystal layer.

11. The liquid crystal display device of claim 5, wherein a surface of said color filter facing said overcoat layer is substantially planar without any step.

12. The liquid crystal display device of claim 5, further comprising a color filter layer between said second substrate and said overcoat layer, wherein a surface shape of said color filter layer is substantially different from said surface shape of said overcoat layer.

13. A liquid crystal display device comprising:

first and second substrates;

a first layer over said first substrate, said first layer having a surface with a first pattern;

an overcoat layer over said second substrate, said overcoat layer having a surface with a second pattern; and a liquid crystal layer between said respective surfaces of said first layer and said overcoat layer, wherein said first and second patterns correspond to each other.

14. The liquid crystal display device according to claim 13, further comprising a counter electrode over said overcoat layer, wherein said first layer is a pixel electrode.

15. The liquid crystal display device according to claim 13, wherein each of said first and second patterns includes at least one step, and wherein said liquid crystal layer has a shape corresponding to said first and second patterns and includes:

a first portion having a first thickness, said first portion satisfying a condition $\Delta n \cdot d \geq \lambda/2$, where $\Delta n$ is optical anisotropy of said liquid crystal, d is a thickness of said liquid crystal layer, and $\lambda$ is a wavelength of transmitted light in said liquid crystal layer; and a second portion having a second thickness smaller than said first thickness.

16. The liquid crystal display device of claim 15, wherein each of said first and second patterns includes steps at defined intervals.

17. The liquid crystal display device of claim 15, wherein said at least one step is tapered at an angle.

18. The liquid crystal display device of claim 13, further comprising a color filter layer between said second substrate and said overcoat layer, wherein a surface shape of said color filter layer is substantially different from the shape of said surface of said overcoat layer with said second pattern.

* * * * *